United States Patent [19]

Talmy et al.

[11] Patent Number: 4,994,419

[45] Date of Patent: Feb. 19, 1991

[54] LOW TEMPERATURE SYNTHESIS OF HIGH PURITY MONOCLINIC CELSIAN USING TOPAZ

[75] Inventors: Inna G. Talmy, Silver Spring, Md.; Deborah A. Haught, Sterling, Va.

[73] Assignee: The United States of America as represented by the Secretary of the Navy, Washington, D.C.

[21] Appl. No.: 580,012

[22] Filed: Sep. 7, 1990

[51] Int. Cl.$^5$ .......................................... C04B 35/18
[52] U.S. Cl. ................................. 501/125; 501/128; 423/327; 423/331; 423/600; 423/637
[58] Field of Search .............. 423/327, 331, 600, 637; 501/125, 128

[56] References Cited

U.S. PATENT DOCUMENTS 3,018,168  1/1962  Marcellus et al. .............. 423/331 X
4,615,987  10/1986  Chyung et al. ........................ 501/8

Primary Examiner—Karl L. Group
Attorney, Agent, or Firm—Kenneth E. Walden; Roger D. Johnson

[57] ABSTRACT

A process for preparing monoclinic celsian from topaz and $BaCO_3$, powders by heating an intimate mixture of the powders at a temperature of from 900° C. to less than 1590° C. in an atmosphere of the gases generated by the monoclinic celsian formation reaction itself.

5 Claims, No Drawings

LOW TEMPERATURE SYNTHESIS OF HIGH PURITY MONOCLINIC CELSIAN USING TOPAZ

BACKGROUND OF THE INVENTION

This invention relates to ceramics and more particularly to aluminosilicate ceramics.

Ceramics based on monoclinic celsian ($BaO \cdot Al_2O_3 \cdot 2SiO_2$) can be considered for applications requiring materials with a combination of high melting point, low thermal expansion, high thermal shock resistance, high-frequency working capabilities, low and thermally stable dielectric constant and low loss tangent. For example, celsian is a promising candidate for use as thermally-stable dielectric and refractory materials. Celsian ceramics have been reported in the literature as having a thermal expansion of $2.5 \times 10^{-6}$/degree (at 20°–1000° C.), bending strength up to 110 MPa, dielectric constant and loss tangent 6–7 and $(1-2) \times 10^{-4}$, respectively, at 20° C. and 1 MHz, and dielectric constant stable up to 600° C. These ceramics were prepared from natural (kaolin or clay) or technical grade purity starting materials containing significant amounts of impurities. The impurities can adversely affect all properties, particularly the strenth and the dielectric behavior of the ceramics at high temperatures.

Celsian with melting point of about 1760° C. exists in two main crystalline modifications: monoclinic, stable up to 1590° C., and hexagonal, stable from 1590° C. to melting temperature. Although the hexagonal modification is stable at temperatures above 1590° C., it tends to be the first product of solid phase reaction and has a strong tendency to persist metastably in the whole temperature range. Hexagonal celsian transforms reversibly into low temperature orthorhombic form at 300° C. This transformation is accompanied by significant volume changes. Because of this fact, hexagonal celsian is of no practical use as a ceramic material for high-temperature applications, especially in thermal cycling. Properties of celsian ceramics mentioned above belong to monoclinic modification. Literature reveals that the transformation of hexagonal celsian into the monoclinic form is promoted by prolonged high-temperature (above 1450° C.) heating, hydrothermal treatment at about 2 kbar pressure, formation of glass phase during firing, and by the presence of impurities or the addition of certain additives (such as $B_2O_3$, LiF, $Cr_2O_3$, $CaF_2$, $ZrSiO_3$). However, the preparation of monoclinic celsian from high-purity raw materials free of undesirable additives by conventional processes can be only accomplished by long term high temperature treatment.

It would be desirable to provide a method of making pure monoclinic celsian at lower temperatures for shorter heating times without the use of contaminating additives.

SUMMARY OF THE INVENTION

Accordingly, an object of this invention is to provide a method of producing pure monoclinic celsian ($BaO \cdot Al_2O_3 \cdot 2SiO_2$) at lower temperatures and shorter heating times than conventional methods.

Another object of this invention is to provide a method of producing monoclinic celsian without the use of chemical additives which would contaminate it and adversely affect its dielectric properties.

A further object of this invention is to provide a method of producing monoclinic celsian without the use of chemical additives which would contaminate it and adversely affect its high temperature strength.

These and other objects of this invention are accomplished by providing a process for preparing monoclinic $BaO \cdot Al_2O_3 \cdot 2SiO_2$ comprising the following steps in order (1) forming an intimate reaction mixture of powders of topaz $Al_2SiO_4F_2$) and $BaCO_3$ wherein the molar ratio of topaz to $BaCO_3$ is from 2:1 to 4:1; and (2) heating the reaction mixture in an atmosphere of the gases generated by the topaz decomposition and the celsian formation reactions at a temperature in the range of from 900° C. to less than 1590° C. until the monoclinic $BaO \cdot Al_2O_3 \cdot 2SiO_2$ is produced.

DETAILED DESCRIPTION OF THE PREFERRED EMBODIMENT

Conventionally, each mole of monoclinic celsian, $BaO \cdot Al_2O_3 \cdot 2SiO_2$ is prepared by reacting 1 mole of $BaCO_3$, 1 mole of $Al_2O_3$, and 2 moles of $SiO_2$ at high temperatures. The process of this invention produces monoclinic celsian ($BaO \cdot Al_2O_3 \cdot 2SiO_2$) at lower temperatures by using topaz $Al_2SiO_4F_2$) in place of the $Al_2O_3$ and $SiO_2$.

The starting materials are topaz ($Al_2SiO_4F_2$) and $BaCO_3$ which are intimately (uniformly) mixed. The molar ratio of topaz to $BaCO_3$ in the starting mixture is from 2:1 to 4:1. Commercially available $BaCO_3$ (99.8%) is preferably used. Natural topaz as it is mined contains impurities which make it unsuitable for this process. Therefore, synthetic topaz is used in this process. It may be synthesized according to the reaction: $2AlF_3 + 2SiO_2 \rightarrow Al_2SiO_4F_2 + SiF_4$ at a temperature of from 700° to 900° C. U.S. patent Ser. No. 4,911,902, herein incorporated in its entirety by reference, provides a teaching for the preparation of synthetic topaz ($Al_2SiO_4F_2$). The particle size of the $BaCO_3$ is preferably less than 40 microns, more preferably 10 microns or less, and still more preferably 5 microns or less. The particle size of the topaz is preferably less than 20, more preferably less than 10, and still more preferably less than 5 microns. The intimate, uniform mixtures of topaz and $BaCO_3$ may be formed by mixing the powders in a suitable volatile solvent such as ethanol and then drying the resulting mixture. The dry mixture is then ground up (with corundum mortar and pestle) and screened through a 500 micron sieve to break up large agglomerates.

In the present process monoclinic celsian is formed from $BaCO_3$ and topaz. It is critical that this reaction step occurs in an atmosphere composed of the gases generated by the topaz decomposition and the celsian formation reactions. This requires a closed reactor. In the examples, the reaction was run in corundum crucibles covered with corundum discs.

The composition of the reaction generated gases and the mechanism by which they participate in the formation of the monoclinic celsian process are not well understood. However, it does appear that $SiF_4$ is an important constituent of the gases generated by the decomposition of topaz and the monoclinic celsian formation reaction. However that may be, the reaction-generated gases are critical for the process to work. This criticality was demonstrated by heating identical samples using the same heating regime in (a) a reaction-generated gas atmosphere (covered crucible), (b) air (uncovered crucible), (c) an inert atmosphere (flowing helium), and (d) vacuum. X-diffraction patterns show that running the celsian formation reaction in the reaction generated gas atmosphere (covered crucible) produces monoclinic celsian with no byproducts (impurities) detected. In contrast, X-ray diffraction patterns show that running the celsian formation reaction in air (uncovered crucible), or an inert atmosphere (flowing helium), or in a vacuum produces primarily hexagonal celsian with some monoclinic celsian and with byproducts (impurities) being clearly detected.

In the monoclinic celsian formation, the topaz and $BaCO_3$ mixture is heated at an elevated temperature in an atmosphere of the reaction-generated gases, preferably under anhydrous conditions, to produce monoclinic celsian, $BaO \cdot Al_2O_3 \cdot 2SiO_2$. The reaction temperature range is preferably from 900° C. to less than 1590° C., more preferably from 900° C. to 1240° C., and still more preferably from 900° C. to 1100° C.. The reaction time for this monoclinic celsian production step is preferably from about 3 to about 10 hours, more preferably from 3 to 5 hours, and still more preferably about 4 hours. The monoclinic celsian product can be held for times longer than 10 hours without damage but there is no advantage to doing so.

The prior art process which prepares monoclinic celsian from $Al_2O_3$, $SiO_2$ and $BaCO_3$ requires approximately 150 hours of heating at 1500° C. In contrast, the present process which prepares monoclinic celsian from topaz and $BaCO_3$ requires only about 3 hours at temperatures as low as 900° C. Thus the need for special high temperature ovens and long heating periods is eliminated.

The general nature of the invention having been set forth, the following examples are presented as specific illustrations thereof. It will be understood that the invention is not limited to these specific examples but is susceptible to various modification that will be recognized by one of ordinary skill in the art.

EXAMPLE 1

2:1 Molar Ratio of topaz to $BaCO_3$ (reaction gas atmosphere)

A 25 gram intimate powder mixture composed of the following weight percentages: topaz, 65.10; and $BaCO_3$, 34.90 was prepared. A portion (0.55g) of this mixture was placed in a 20 ml corundum crucible and covered with a corundum disc. The covered crucible was heated according to the following firing schedule:

(1) ramped from room temperature to 800° C. at 5° C./minute;
(2) held at 800° C. for 1 hour;
(3) ramped from 800° C. to 1200° C. at 5° C./minute; and
(4) held at 1200° C. for 1 hour. The product was monoclinic celsian

EXAMPLE 2

2:1 Molar Ratio of Topaz to $BaCO_3$ (air)

Same as example 1 except that the crucible was not covered. The product was primarily hexagonal celsian with a small amount of monoclinic celsian and detectable amounts of byproducts (impurities).

EXAMPLE 3

2:1 Molar Ratio of Topaz to $BaCO_3$ (inert atmosphere)

A portion (29.8 mg) of the mixture prepare in example 1 was place in a flowing helium reactor and subjected to the heating regime used in example 1. A continuous flow of helium was maintained during the entire heating regime. The product was primarily hexagonal celsian with a small amount of monoclinic celsian and detectable amounts of byproducts (impurities).

EXAMPLE 4

4:1 Molar Ratio of topaz to $BaCO_3$ (reaction gas atmosphere)

An 8 gram intimate powder mixture composed of the following weighed percentages: topaz, 78.86; and $BaCO_3$, 21.14 was prepared. A portion (1.0 g) of this mixture was placed in a 20 ml corundum crucible and covered with a corundum disc. The covered crucible was heated according to the following firing schedule:

(1) ramped from room temperature to 800° C. at 5° C./minute;
(2) held at 800° C. for 1 hour;
(3) ramped from 800° C. to 900° C. at 2.5° C./minute; and
(4) held at 900° C. for 3 hours. The product was monoclinic celsian.

EXAMPLE 5

4:1 Molar Ratio of Topaz to $BaCO_3$ (air)

Same as example 4 except that the crucible was not covered. The product was primarily hexagonal celsian with a small amount of monoclinic celsian and detectable amounts of byproducts (impurities).

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A process for preparing monoclinic $BaO \cdot Al_2O_3 \cdot 2SiO_2$ comprising the following steps in order
    (1) forming an intimate reaction mixture of powders of topaz and $BaCO_3$ wherein the molar ratio of topaz to $BaCO_3$ is from 2:1 to 4:1; and
    (2) heating the reaction mixture to initiate a celsian formation reaction, in an atmosphere of gases generated by the celsian formation reaction, at a temperature in the range of from 900° C. to less than 1590° C. until the monoclinic celsian is produced.
2. The process of claim 1 wherein the molar ratio of topaz to $BaCO_3$ is 2:1.
3. The process of claim 1 wherein the molar ratio of topaz to $BaCO_3$ is 4:1.
4. The process of claim 1 wherein the temperature in step (2) is in the range of from 900° C. to 1240° C.
5. The process of claim 4 wherein the temperature in step (2) is in the range of from 900° C. to 1100° C.